United States Patent [19]

Barker et al.

[11] Patent Number: 5,142,674
[45] Date of Patent: Aug. 25, 1992

[54] INTERCHANGE OBJECT DATA BASE INDEX WHICH ELIMINATES THE NEED FOR PRIVATE COPIES OF INTERCHANGE DOCUMENTS FILES BY A PLURALITY OF APPLICATION PROGRAMS

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 593,325

[22] Filed: Oct. 1, 1990

Related U.S. Application Data

[63] Continuation of Ser. No. 165,316, Mar. 8, 1988, abandoned.

[51] Int. Cl.$^5$ .............................................. G06F 15/40
[52] U.S. Cl. .............................. 395/600; 364/282.1; 364/282.4; 364/283.2; 364/242.94; 364/DIG. 1; 395/800
[58] Field of Search .............................. 395/600, 800; 364/200 MS File, 900 MS File

[56] References Cited

U.S. PATENT DOCUMENTS

| | | | |
|---|---|---|---|
| 4,325,120 | 4/1982 | Colley et al. | 364/200 |
| 4,531,186 | 7/1985 | Knapman | 364/300 |
| 4,631,673 | 12/1986 | Haas et al. | 364/300 |
| 4,694,396 | 9/1987 | Weisshaar et al. | 364/200 |
| 4,811,216 | 3/1989 | Bishop et al. | 364/200 |
| 4,914,583 | 4/1990 | Weisshaar et al. | 364/200 |
| 4,992,972 | 2/1991 | Brooks et al. | 364/900 |

*Primary Examiner*—Thomas C. Lee
*Assistant Examiner*—William M. Treat
*Attorney, Agent, or Firm*—Whitham & Marhoefer

[57] ABSTRACT

The need for private copies of an interchange document file in a computer system is eliminated by building a common architected index characterized in that (1) it includes selected indexable elements each having sufficient associated pointers for environment and resource specifications to be accessed as stand-alone entities and (2) is structured to be handled by all application programs or processes understanding the interchange protocol. Normal work with a file requires reading the entire document file and building a process' own index. This requires excessive time and takes up storage which could be used for other purposes. By building an architected document index with associated pointers in turn associated with each indexable element, any desired element of the document can be readily addressed by many different application program.

6 Claims, 6 Drawing Sheets

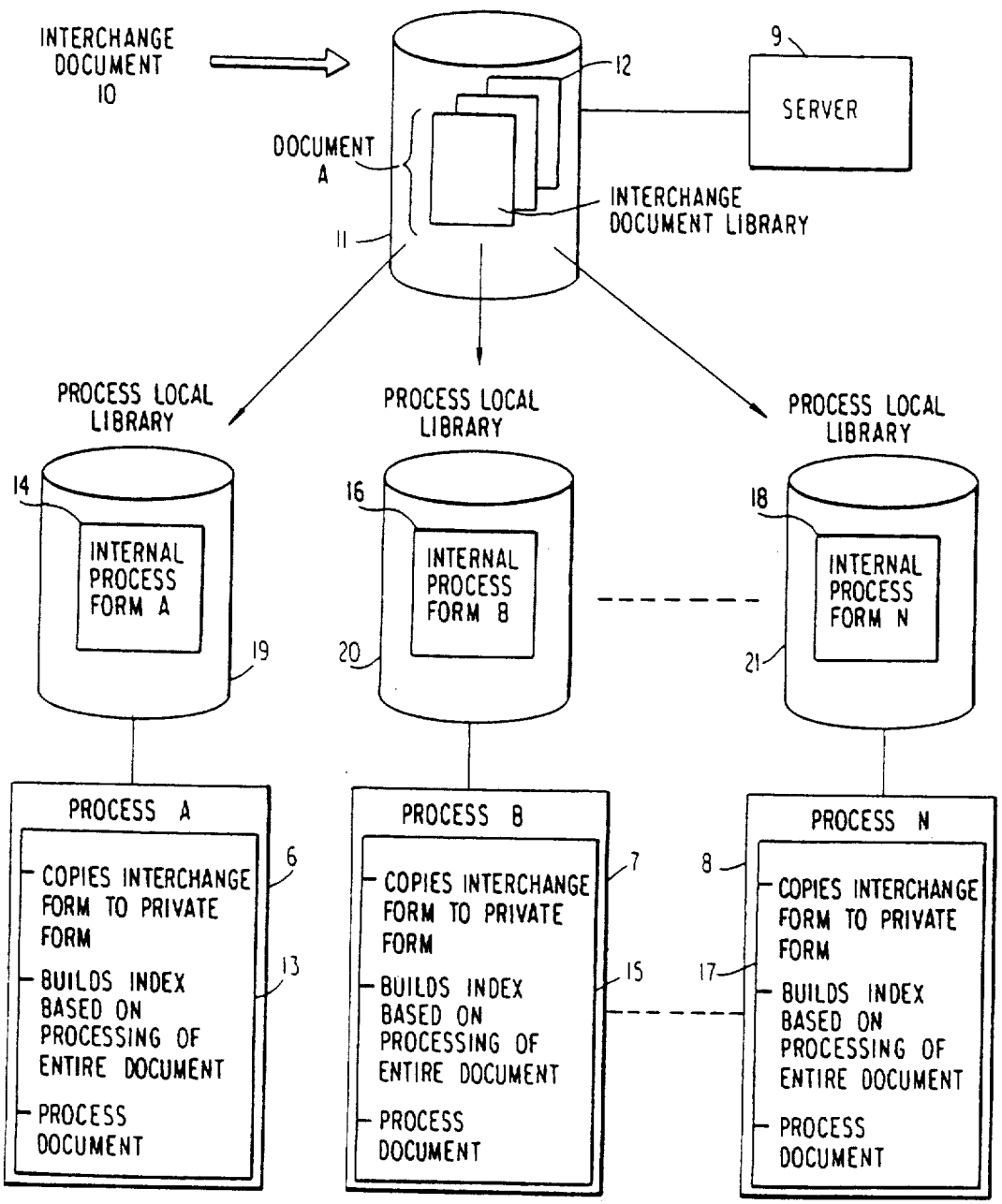

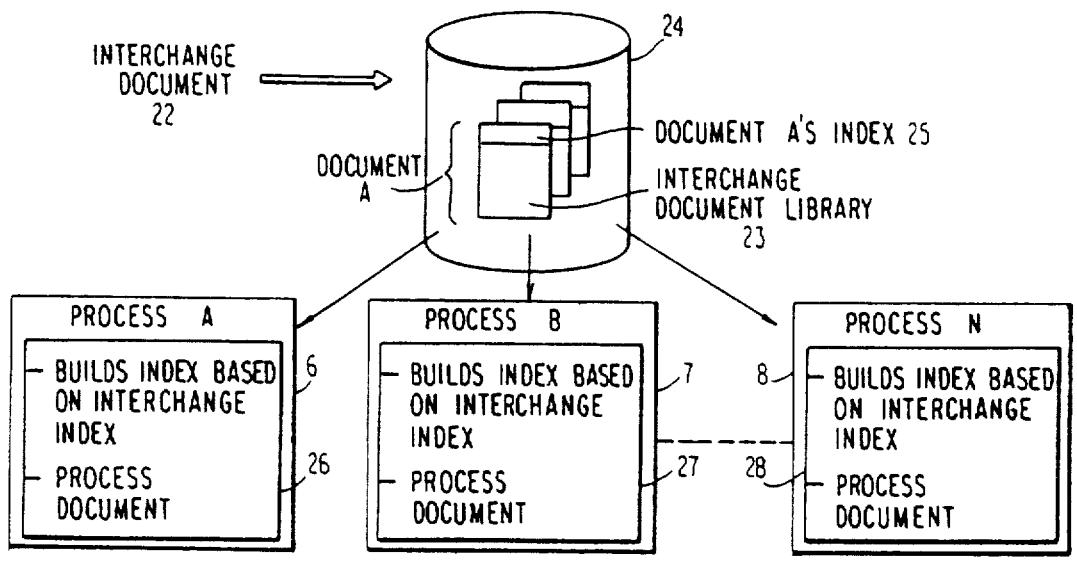
FIG. 2 PROPOSED DOCUMENT INTERCHANGE WITH INTERCHANGE INDEX
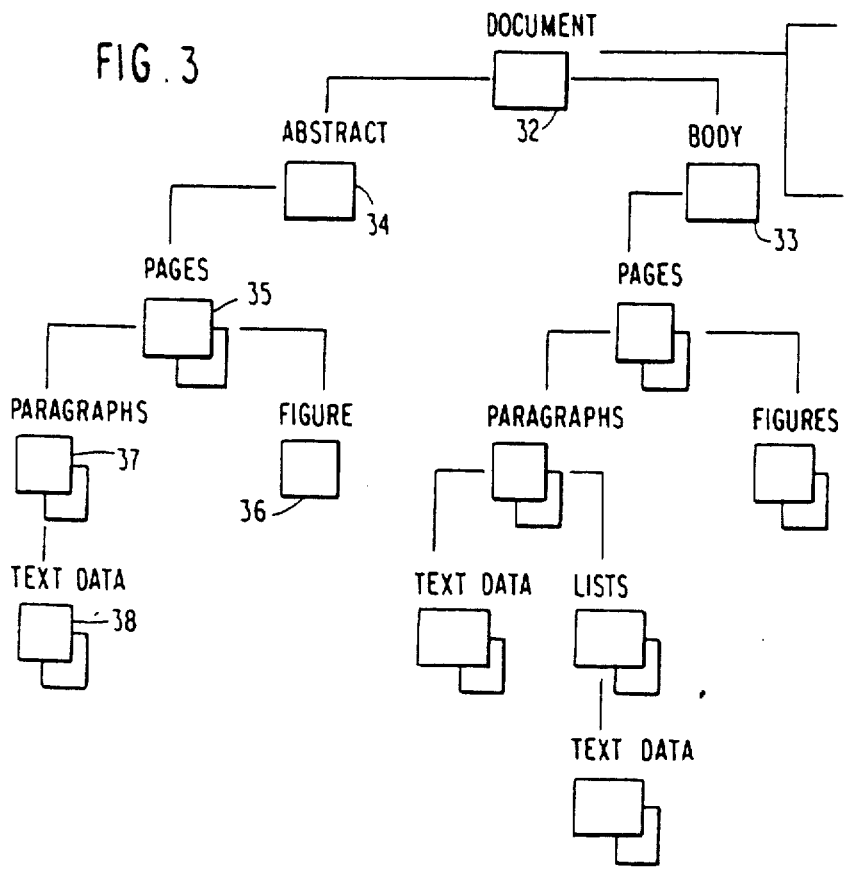
FIG. 3

INTERCHANGE OBJECT DATA BASE INDEX WHICH ELIMINATES THE NEED FOR PRIVATE COPIES OF INTERCHANGE DOCUMENTS FILES BY A PLURALITY OF APPLICATION PROGRAMS

This is a continuation of Ser. No. 07/165,316, filed Mar. 8, 1988, now abandoned.

BACKGROUND OF THE INVENTION

1. Field of the Invention

The present invention generally relates to the specification of interchange document indices that provide data processing systems the necessary information to construct application dependent indices to an object oriented document database for random object retrieval. Processes may select portions of a document to build locally optimized database indices from the interchange form of a stored library document without processing the entire document. The invention also enhances document sharing through the elimination of replicated forms of the library document that occur when application processes build "process local copies."

2. Description of the Prior Art

In data processing systems, there are the correlative problems of storing data in an efficient manner and later accessing the stored data, also in an efficient manner. The stored data constitutes a database the value of which is considerably enhanced when it may be shared by multiple "processes" at the same time. In this context, a process may be considered a computer application program, and it is assumed here that the computer application programs which may access the data in the database may be diverse programs; that is, the programs are not identical. This in turn assumes a certain protocol in the storing, accessing and interpreting the data in the database which is observed by all processes.

There exist various database system architectures which implement various data structures, including the relational approach, the hierarchical approach and the network approach. Generally speaking, the relational approach presents the database to a user as a series of tables. The hierarchical approach presents the user with a view of the database as a tree structure having a "root" and a plurality of branching "nodes". A node connected to another node that is closest to the root is described as the "parent" and the other, as the "child". The network approach has some similarity to the hierarchical approach in that data is represented as linked records.

The subject invention uses a hierarchical approach to database management and indices because it mirrors the hierarchical structure of a compound interchange document containing both architecture defined (e.g., a page) and user defined (e.g., a paragraph) document elements. The general concepts of and the use of indices are well known in the data processing arts, and it is assumed that those skilled in the art will be well versed in the same. Further background may be had by reference to the text book by Christopher J. Date entitled *An Introduction to Database Systems*, vol. 1, third edition, published 1981 by Addison-Wesley.

The specific environment of the invention is in the field of a data stream architecture that allows processing applications the capability to interchange document data from a sending application program to a receiving application program without knowing the receiver's processing capability. Normal work with an object oriented interchange document requires reading the entire file and building a "process local" document copy together with its own index. This requires excessive time and takes up storage which could be used for other purposes.

SUMMARY OF THE INVENTION

It is therefore an object of the present invention to provide a method for eliminating a requirement for a private copy of the interchange document and the requirement of sequentially processing the entire document before local document indices can be built.

According to the invention, the need for private copies of interchange documents is eliminated by the capability of specifying a document interchange index that correlates to the interchange document elements. The index contains selected indexable elements each having sufficient associated pointers for environment and resource specifications to exist as stand-alone document entities and is structured to be handled by all application programs that understand the interchange document protocol. By building a common document interchange element index with associated pointers in turn associated with each entry, any desired object element of the document can be readily accessed by many different application programs.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 1 is a block diagram illustrating the current process of document interchange;

FIG. 2 is a block diagram illustrating the process of document interchange according to the invention;

FIG. 3 is a block diagram showing the document index structure according to the invention;

DETAILED DESCRIPTION OF THE PREFERRED EMBODIMENT OF THE INVENTION

Figure 4:
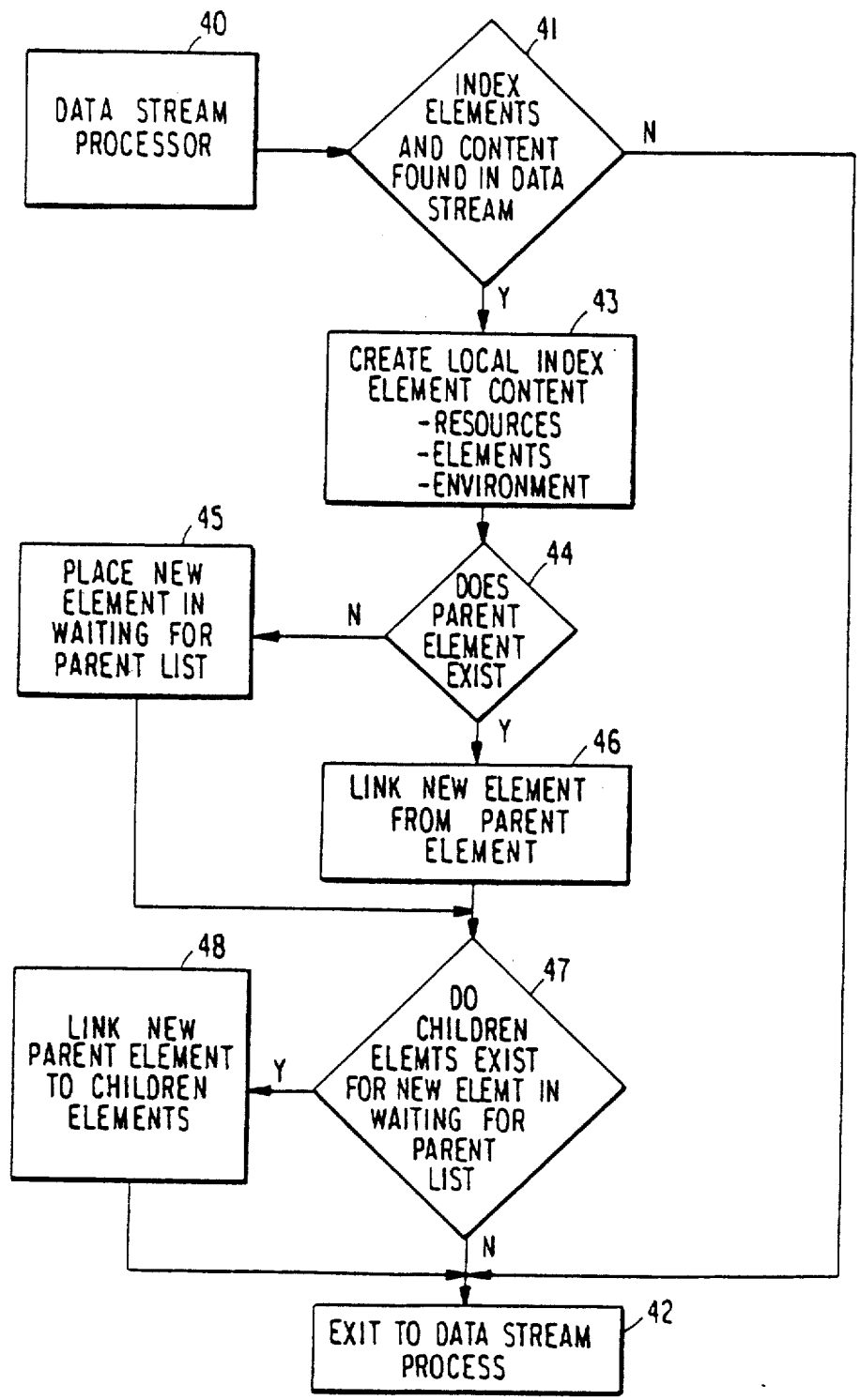
FIG. 4 is a flow diagram showing the logic of building a process local index from an interchange index.

Referring now to the drawings, and more particularly to FIG. 1, there is shown a block diagram illustrating the current process of document interchange. An interchange document 10 is stored in an interchange document library 12, which is typically contained on a central direct access storage device (DASD) 11 accessed by a network file server 9. Each of a plurality of application programs 13, 15 and 17, here identified as Processes A through N, running on computers 6, 7 and 8 in the network, desire to access a document in the interchange document library 12. To do this, the interchange document accessed, such as document A, must first be copied to the user's local library. Thus, for example, Process A running on computer 6 copies an interchange document to its local library 14. Process B running on computer 7 copies an interchange document to its local library 16, and Process N running on computer 8 copies an interchange document to its local library 18. Each of these libraries may be a local DASD or a volume of a DASD allocated to the respective processes, here represented by respective DASDs 19, 20 and 21. The process of copying the interchange document from the interchange document library 12 on DASD 11 to one of the process local libraries 14, 16 and 18 on DASDs 19, 20 and 21 is accomplished by converting the interchange format to a private format specific to the local process 13, 15 and 17, respectively.

During or after the copy of the interchange document to the local library in the private format of the process, the process builds object element indices for the document. This is accomplished by interpreting the document content to detect elements of the document to be indexed. Only when the document has been indexed by the process accessing the document can the process finally begin the task of accessing elements within the document for processing, such as editing.

The subject invention simplifies and streamlines the conventional process by adopting an interchange index for document interchange as shown in FIG. 2. Here the interchange document 22 is stored in an interchange document library 23 on DASD 24 accessed by the network file server (not shown), but in this case, each document in the interchange library is provided with an interchange index. As a result, it is not necessary for the processes 26, 27 and 28 running on the computers 6, 7 and 8, respectively, when accessing the document to copy the interchange document to its local process library in a format specific to the process. Instead, a process, such as Process A, simply builds its own index based on the document's interchange index, and using this local index, Process A may then access that part of the interchange document it needs to process. In like manner, Processes B through N build their own indices based on the document's interchange index, and using their own local index, Processes B through N access that part of the document they need to process.

FIG. 3 illustrates, in block diagram form, a sample structure of element indices transmitted with an interchange document. The potential content of each element is depicted in box 31 to the right of element 32 labled "DOCUMENT". Each indexable element is wholly self-contained in that its processing environment, resources and element content are accessable via constructs defined and existing within the interchange index element definition. In the context of this invention, what is meant by the processing environment is, for example, formatting descriptions, what is meant by resources are fonts, overlays and the like, and what is meant by elements or data objects are such things as text, image and graphics data.

For ease of understanding, FIG. 3 is limited to displaying only the element hierarchy since an element's resource and environment constructs can be directly indicated in an index element definition. A processing application then "mirrors" the interchange index element specification by hierarchically linking the document index elements and their associated content in a process local manner that is optimized for that particular application. Where many elements exist at a particular hierarchy level (e.g., pages one to fifty in the BODY 33 of a document), the process is free to implement any mechanism (e.g., a sorted page address table for each page in the BODY element 33) deemed acceptable by the application process. Byte offsets to document entities described by the interchange definition may be converted to process local addressing schemes that correlate to the storage device on which the interchange document resides. For example, byte offsets can be transformed to direct access storage device (DASD) addresses. It is assumed that during process execution the application is cognizant of the hierarchical context in which current document activity is occurring. A process then may utilize the internal form of the interchange document index to randomly retrieve a document element such as paragraph two on page thirty-seven. The sample document shown in FIG. 3 indicates that (for the ABSTRACT leg of the hierarchy) the DOCUMENT 32 consists of a single ABSTRACT element 34 containing more than one PAGE. The PAGE 35 then contains more than one PARAGRAPH and a single FIG. 36. The PARAGRAPH element 37 content is then the TEXT DATA 38. A similar scenario can be stated for the BODY leg of the DOCUMENT hierarchy.

FIG. 4 is a flow diagram showing the logic of building process local indices from an interchange index. This process assumes a random input of elements from a data stream processor 40. The output of the data stream processor 40 is tested in decision block 41 to determine if index elements and associated content are found or referenced in the data stream. If not, the process exits to the data stream process at block 42. However, if index elements and content are encountered in the data stream, then a local index is created in function block 43. The content of the elements in the index include their resources, other document elements and environment. For each new element in the index, a test is made in decision block 44 to determine if a parent element exists. See again the hierarchical structure of FIG. 3. If not, the new element is placed in a "waiting for parent list" in function block 45; otherwise, the new element is linked from its parent element in function block 46. A test is next made in decision block 47 to determine if children elements exist for new elements in the "waiting for parent list". If so, the new parent element is linked to the children elements in function block 48 before the process exits to the data stream process; otherwise, the process exits directly to the data stream process in function block 42.

The following pseudo code, written in Program Design Language (PDL), implements the logic of the flow diagram shown in FIG. 4. It is assumed that an interchange document has just been received by an application that wishes to modify certain sections of the document without sequentially processing the entire document to establish the processing environment for the changed document portions. The application then uses the interchange document index elements so it can access the sections to be modified. It must build its internal element index from the interchange element index and, IF an Index Element and its associated Content are Encountered in the data stream, THEN:
  CREATE the process local internal form identifying the element and its content (i.e., objects, resources and environment). The internal process form of the interchange element index is dependent on the performance and library access characteristics of the particular application.
  IF a parent index element exists for the new index element, THEN:

LINK the new index element to the parent index element in order to parallel the index element hierarchy defined in the interchange data stream. For example, this maintains the document hierarchy relationship for indexable elements as shown in FIG. 3.

ELSE:
PLACE the new index element in a "waiting for parent list". Note that the index element specifications in the interchange data stream are not required to appear in any specific physical sequence. The description of an index element permits an application process to construct an index element hierarchy as show in FIG. 3.

IF unlinked children index elements exist for the "new" index element in the "waiting for parent list", THEN:
LINK the new index element as the parent to the children index element(s).

Figure 5:
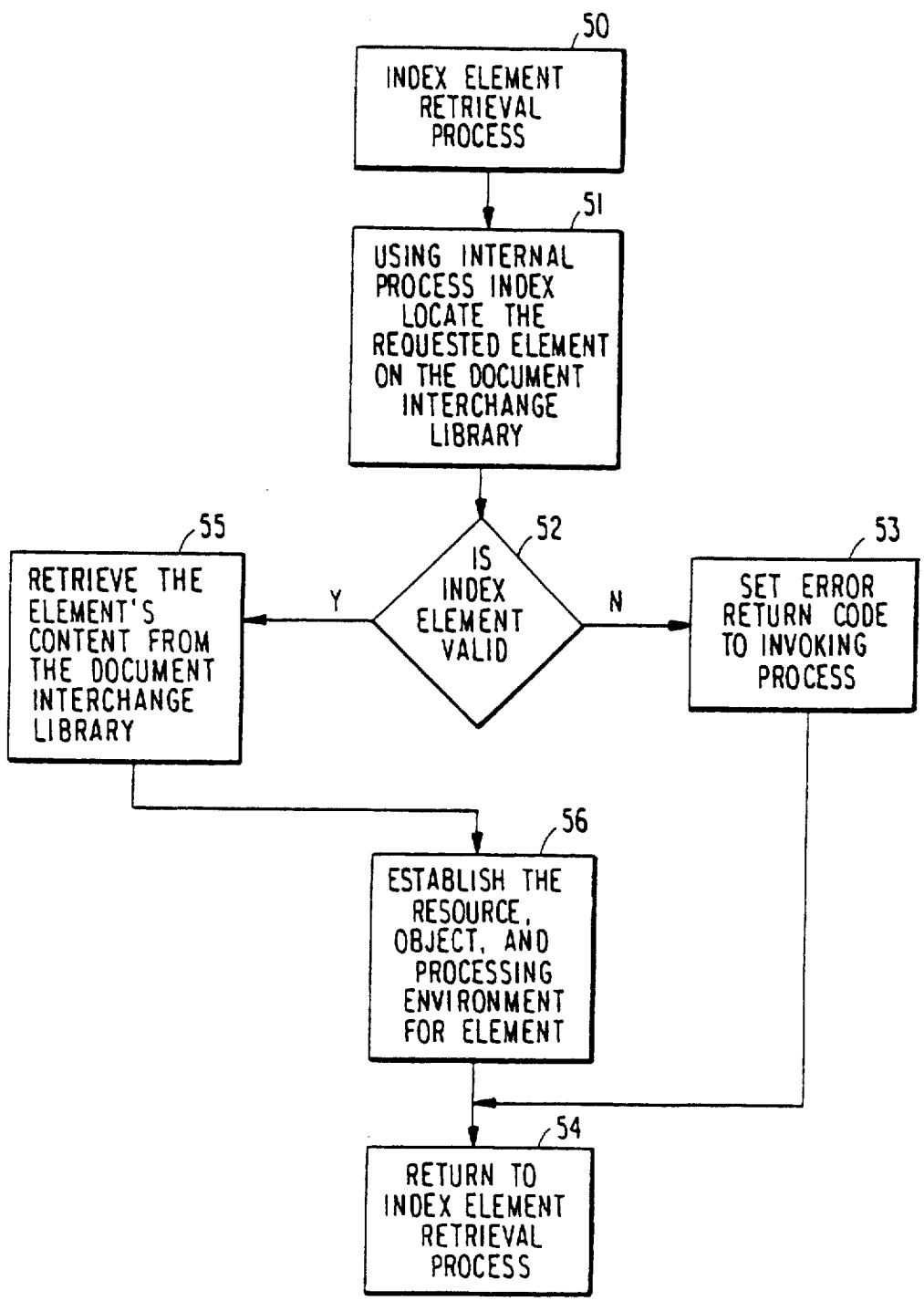
FIG. 5 is a flow diagram showing the logic of retrieving an index element from the process local index.

ELSE:
EXIT to the process that interprets the interchange data stream Structured Fields.
ENDIF:
ENDIF:

ELSE:
EXIT to the process that interprets the interchange data stream Structured Fields.
ENDIF:

FIG. 5 is a flow diagram showing the logic of the process of retrieving an index element from a process local index. The process begins in function block 50 which calls the operation of locating the requested element on the document interchange library using the internal process index in function block 51. A test is made in decision block 52 to determine if the index element is valid. If not, an error return code is set to the invoking process in function block 53 before a return is made to the index element retrieval process in function block 54. On the other hand, if the index element is valid, the element's content is retrieved from the document interchange library in function block 55. Then, the resource, object and processing environment for the element is established in function block 56 before a return to the index element retrieval process is made in function block 54.

Figure 6:
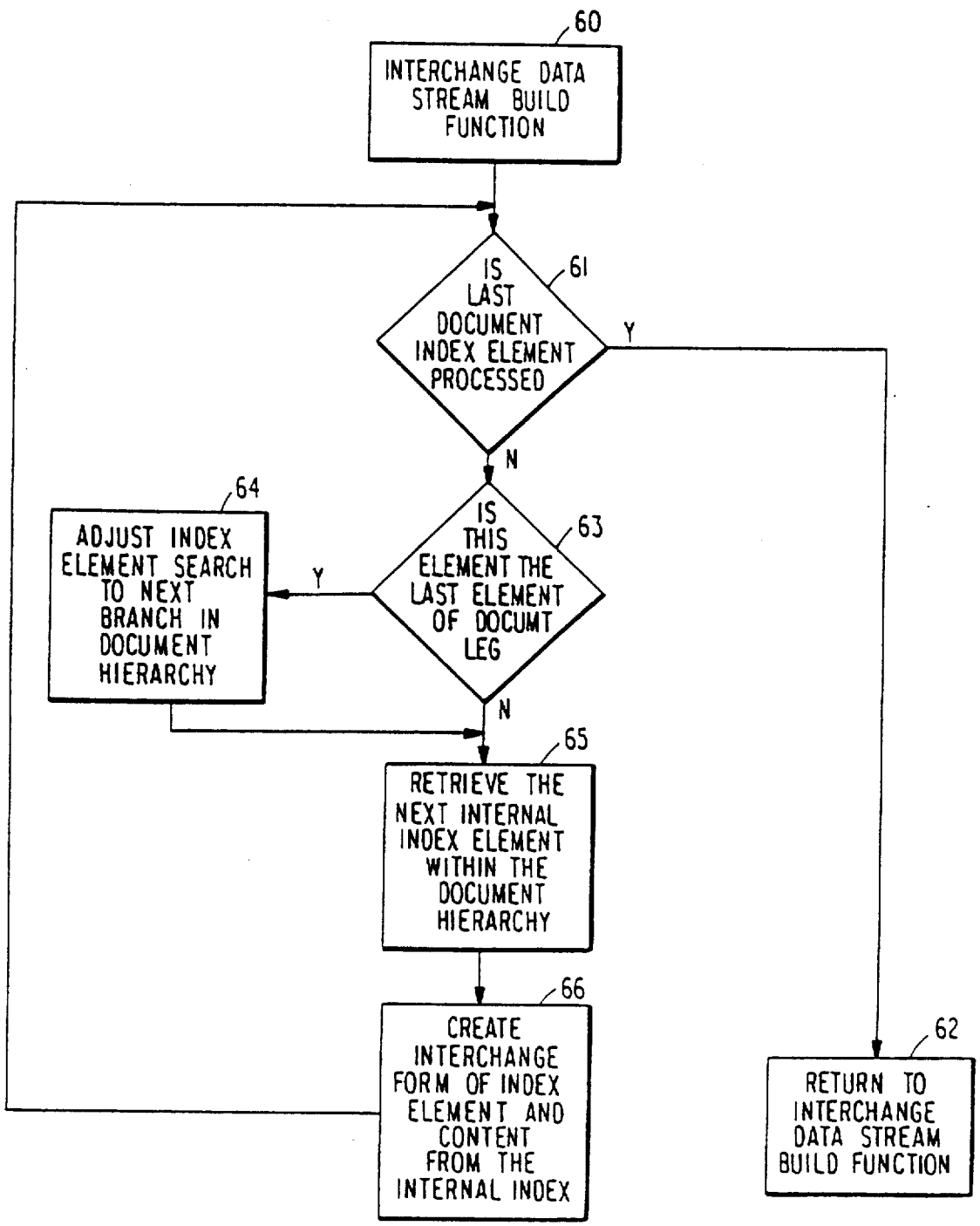
FIG. 6 is a flow diagram showing the logic of building an interchange index from the process local index.

The following pseudo code, written in Program Design Language (PDL), implements the logic of the the flow diagram shown in FIG. 5. It is assumed that the processing application has requested access to a document index element (e.g., LIST ITEM three in PARAGRAPH one on PAGE twelve in the BODY section of a document) that needs to be updated. The processing application then, knowing the hierarchical document context in which the request was generated, searches its internal form of the document index and, IF the Index Element and its associated Content exist in the processes' internal document element index, THEN:
RETRIEVE the index element's content from the interchange document library using the internal element index that it created for the index elements defined in the interchange document.
ESTABLISH the resource, object and processing environment associated with the requested document index element. In the example stated previously, a resource (e.g., font) might be necessary to display the text data (object) in the correct area (formatting environment) on a screen.
RETURN to the processing application.
ELSE:
SET an error code indicating that the requested document index element does not exist.
RETURN to the processing application.
ENDIF:

The flow diagram shown in FIG. 6 shows the logic of the process for building an interchange index from a process local index. The process begins with a call to the interchange data stream build function in block 60. A test is made in decision block 61 to determine if the last document index element has been processed. If it has, a return is made to the interchange data stream build function in function block 62; otherwise, another test is made in decision block 63 to determine if this element is the last element of the document leg. By leg, what is meant is again the hierarchical structure shown in FIG. 3. If the test in decision block 63 is positive, the index element search is adjusted to the next branch in the document hierarchy in function block 64; if negative or after the adjustment of the search in function block 64, the next internal index element within the document hierarchy is retrieved in function block 65. Then, the interchange form of the index element and its associated content is created from the internal index in function block 66 before the process loops back to decision block 61.

The following pseudo code, written in Program Design Language (PDL), represents an implementation of the logic of the flow diagram of FIG. 6. It is assumed that a processing application wants to transmit the document it has been updating to an editor for inclusion of some recently added pages created in another department. The application can then create the interchange document element index from its internal form in order to facilitate both the receiver's processing requirements and its own processing requirements whenever the edited document is returned.

Figure 7:
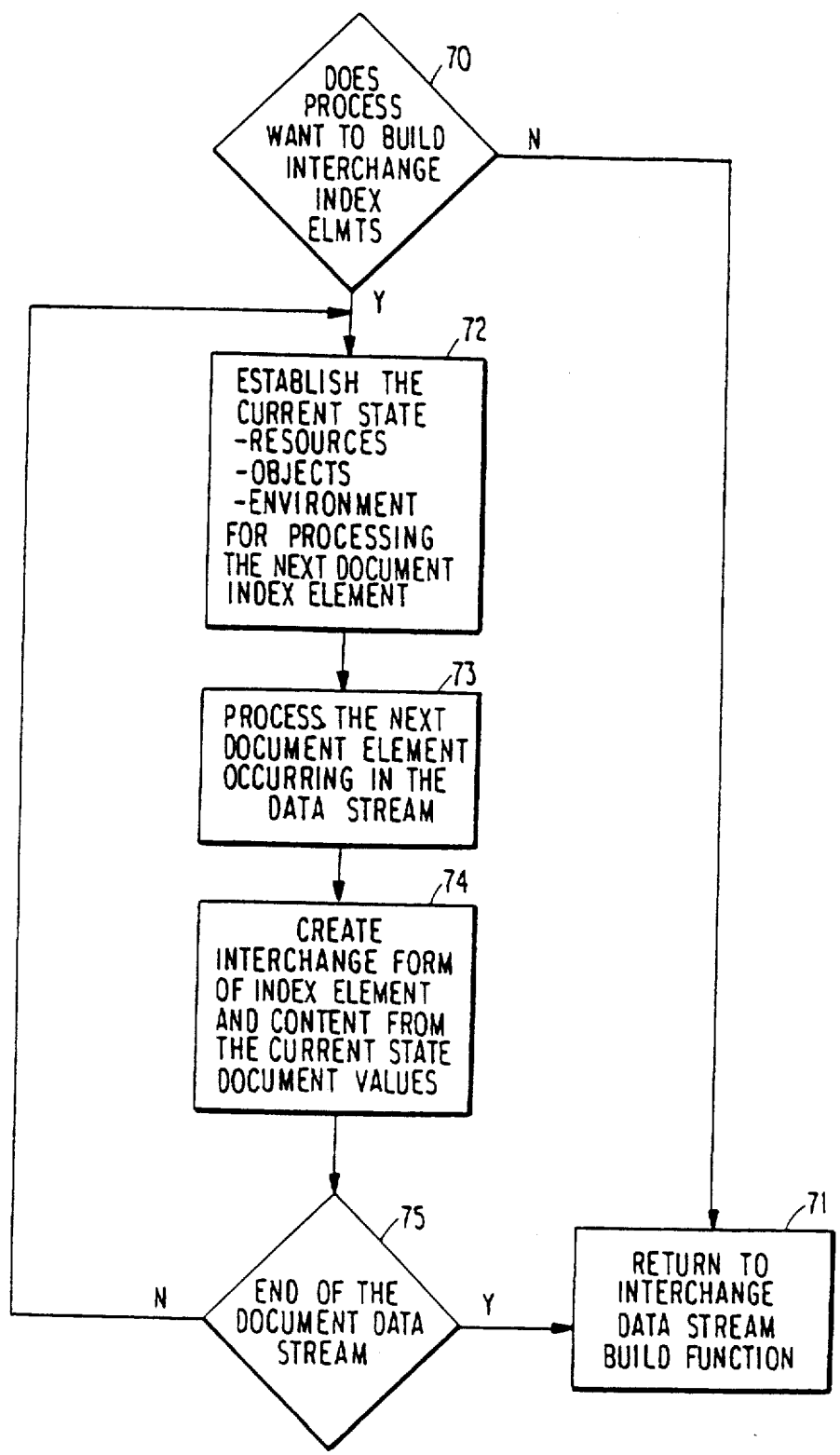
FIG. 7 is a flow diagram showing the logic of building an interchange index from a sequential data stream.

IF the last document index element has been processed, THEN:
RETURN to the interchange data stream build function.
ELSE:
IF the last document index element within a particular hierarchical leg (branch) has not been processed, THEN:
RETRIEVE the next internal index element within the particular leg of the element hierarchy. For example, in FIG. 3 one leg of the ABSTRACT-DOCUMENT hierarchy is ABSTRACT, PAGES, PARAGRAPHS, and TEXT DATA. The other leg of the DOCUMENT-ABSTRACT hierarchy is ABSTRACT, PAGES and FIGURE.
CREATE the interchange form of the index element and its content from the application's internal format.
ELSE:
ADJUST the process' internal element search to the next leg in the document index element hierarchy. For example, if the last TEXT DATA element in the DOCUMENT, BODY, PAGES, PARAGRAPHS, LISTS, TEXT DATA leg has just been processed, then the index element search would resume at the DOCUMENT, BODY, PAGES, FIGURES leg.
RETRIEVE the next internal index element within the particular leg of the element hierarchy.
CREATE the interchange form of the index element and its content from the application's internal format.
ENDIF:
ENDIF:

FIG. 7 is a flow diagram of the logic for building an interchange index from a sequential data stream. The process begins by determining in decision block 70 whether the calling process wants to build interchange index elements. If not, the process returns to the interchange data stream build function in block 71; otherwise, the current state of the resources, objects and environement for processing is established for the next document index element in function block 72. The next document element occurring in the data stream is processed in function block 73, and then in function block 74, the interchange form of the index element and its associated content are created from the current state document values. A test is then made in decision block 75 to determine if the end of the document data stream has been reached. If not, the process loops back to function block 72, but if so, a return is made to the interchange data stream build function in block 71.

The following pseudo code, written in Program Design Language (PDL), implements the logic of the flow diagram of FIG. 7. It is assumed that a processing application wants to build interchange index elements from its internal form of the document data stream which does not contain internal index elements.

IF the application does not want to build the interchange form of the document's elements, THEN:
RETURN to the interchange data stream build function.
ELSE:
ESTABLISH the current state for resources, objects and processing environment in order to preserve this information for the next document index element occurring in the data stream.
PROCESS the next document index element occurring sequentially in the data stream.
CREATE the interchange form of the index element and its content from the application's current state information that describes the current state for the particular index element.
IF the end of the sequential document data stream occurs, THEN:
RETURN to the interchange data stream build function.
ELSE:
ENDIF:
ENDIF:

By providing an interchange document index, the requirement for a private copy of interchange document files is eliminated. This simplifies and streamlines the process of document interchange processing with a resultant elimination of overhead expense to each process accessing the document and an increase in the processing speed.

While the invention has been described in terms of a single preferred embodiment, those skilled in the art will recognize that the invention can be practiced with modification within spirit and scope of the appended claims.

Having thus described our invention, what we claim as new and desire to secure by Letters Patent is as follows:

1. In a computer system including a file server and a plurality of computers connected in a network, wherein each of said computers are running diverse application programs and have access to a local direct access storage device on which is stored a local library corresponding to the computer, said computer system further including a central direct access storage device is accessed by said file server, said central direct access storage device storing a plurality of interchange documents in an interchange document library, each document in said interchange library being composed of a plurality of document elements and provided with an interchange index, a method of eliminating a requirement of a private copy of interchange document files by a plurality of said diverse application programs running on respective ones of said computers in said computer system, said method comprising the computer performed steps of:

building and maintaining by said application programs running on said computers a common document interchange index during file creation and modification, each document in said interchange library being composed of a plurality of document elements with each document element standing alone in an application processing environment, said interchange index including pointers associated with each indexable element in a hierarchical data structure of said document elements;

receiving a data stream over said network by said computers of said computer system, said data stream including index elements of said interchange index;

building by application programs running on each of said computers local database indices which are application dependent and which are optimized for the application programs, said building step being performed without processing an entire document;

storing said local database indices on said local direct access storage device;

thereafter accessing by any of said application programs respective local database indices to select portions of a document in said interchange document library on said central direct access storage device for accessing and processing.

2. The method according to claim 1 wherein a local index is built from said interchange index by a data stream processor comprising the steps of:

detecting index elements in a data stream containing said interchange index and creating a local index of document element content including resources, data objects and processing environment;

testing each index element to determine if a parent element in a hierarchical structure of elements exists and, if not, placing the index element in a list file, otherwise, linking the index element to the parent element; and testing each index element in said list file to determine if children elements exist for the index element and, if so, linking the index element in the list file to the children elements before exiting to said data stream processor, otherwise, exiting directly to the data stream processor.

3. The method according to claim 2 wherein an index element is retrieved from a local index by one of said application programs comprising the steps of:
- using the local index to locate a requested element on a document file;
- retrieving the requested element from the document file; and
- establishing resource, data object and processing environment for a retrieved element before returning to an element retrieval process.

4. The method according to claim 2 including an interchange data stream build function wherein an interchange index for transmission of a document to another application program is built from a local index by said data stream processor comprising the steps of:
- for each element in the local index, determining whether the element is a last document index element to be processed and, if so, making a return to the interchange data stream build function;
- otherwise, testing each element to determine if the element is a last element of a document leg in a hierarchical local process index and, if the element is, adjusting an local element search to another branch in a document hierarchy before retrieving a next internal index element within the document hierarchy, but if the element is not, then retrieving a next internal index element within the document hierarchy; and
- creating an interchange form of index element and content from the local process index before repeating the steps for a next document index element until the last document index element is processed.

5. The method according to claim 1 wherein the step of building and maintaining a common document interchange index from a sequential data stream defining a document comprises the computer system performed steps of:
- establishing a current state of resources, data objects and processing environment for each document index element; and
- creating an interchange form of index element and content from a current state of each said document index element until an end of said data stream is reached.

6. A computer system comprising:
- a file server and a plurality of computers connected in a network, each of said computers running diverse application programs and having access to a local direct access storage device on which is stored a local library corresponding to the computer;
- a central direct access storage device accessed by said file server, said central direct access storage device storing a plurality of interchange documents in an interchange document library, each document in said interchange library being composed of a plurality of document elements and provided with an interchange index, said interchange index being built during file creation and modification with each of said document elements being capable of standing alone in each of said diverse application programs, said interchange index including pointers associated with each indexable element in a hierarchical data structure of said document elements;
- each of said application programs running on one of said computers building a local database index which is application dependent without processing an entire document by receiving a data stream containing said interchange index over said network, detecting index elements in said data stream, and linking detected index elements in a hierarchical data structure which is optimized for the application program, said local database index being stored on said local direct access storage device; and
- each of said application programs running on one of said computers thereafter accessing respective local database indices to select portions of a document in said interchange document library on said central direct access storage device for accessing and processing without processing said entire document.

* * * * *